United States Patent [19]
Molnar et al.

[11] Patent Number: 5,940,601
[45] Date of Patent: Aug. 17, 1999

[54] CONTROL CIRCUIT AND METHOD FOR A FIRST-IN FIRST-OUT DATA PIPELINE

[75] Inventors: Charles E. Molnar, Webster Groves, Mo.; Ian W. Jones, Saratoga, Calif.

[73] Assignee: Sun Microsystems, Inc., Palo Alto, Calif.

[21] Appl. No.: 08/865,900

[22] Filed: May 30, 1997

Related U.S. Application Data

[63] Continuation of application No. 08/303,919, Sep. 9, 1994, which is a continuation-in-part of application No. 08/140,654, Oct. 21, 1993, Pat. No. 5,572,690, and a continuation-in-part of application No. 08/140,655, Oct. 21, 1993, abandoned.

[51] Int. Cl.$^6$ ...................................................... G06F 13/00
[52] U.S. Cl. ...................................... 395/309; 365/189.05
[58] Field of Search ...................... 395/309; 365/189.05, 365/220

[56] References Cited

U.S. PATENT DOCUMENTS

| | | | |
|---|---|---|---|
| 4,755,810 | 7/1988 | Knierim | 345/123 |
| 4,819,201 | 4/1989 | Thomas et al. | 365/221 |
| 5,185,599 | 2/1993 | Doornink et al. | 345/516 |

OTHER PUBLICATIONS

Sutherland, Sproull and Associates (SSA#4179), "FIFO Controls Four–Phase Storage Elements", Sep. 22, 1985, pp. 1–25.

Primary Examiner—William M. Treat
Attorney, Agent, or Firm—Timothy J. Crean; Robert S. Hauser

[57] ABSTRACT

Several designs of a stage for use in a FIFO pipeline are disclosed. Each stage includes a latch that is capable of latching a data element and capable of transitioning between a transparent state and an opaque state. The stages also include a control circuit capable of announcing the availability of the data element to the next stage as soon as the data element has propagated through the latch and without any latching or unlatching action of the latch prior to the announcement of the availability of the data element. In other words, if the latch of a stage is transparent and receives a signal Ri from the previous stage, the control circuit of the stage generates signal Ro after receiving signal Ri, thus enabling the next stage to latch the data element before the current stage has itself latched that data element. This feature is possible because the next stage receives at the input Din of latch block the same data element that appears at the input Din of the current latch block when the current latch block is transparent.

51 Claims, 6 Drawing Sheets

CONTROL CIRCUIT AND METHOD FOR A FIRST-IN FIRST-OUT DATA PIPELINE

CROSS REFERENCE TO RELATED APPLICATIONS

This is a continuation of Ser. No. 08/303,919, filed Sep. 9, 1994, which is a continuation in part of U.S. patent applications Ser. No. 08/140,654, filed Oct. 21, 1993 entitled "Counterflow Pipeline", now U.S. Pat. No. 5,572,690, and Ser. No. 08/140,655 entitled "Counterflow Pipeline Processor", Pat. No. 5,600,848, both filed Oct. 21, 1993, now abandoned, and both incorporated by reference herein.

BACKGROUND OF THE INVENTION

1. Field of the Invention

The present invention relates to a first-in first-out (FIFO) data pipeline having a plurality of stages, and more particularly, to a pipeline stage in the FIFO that makes a data element received at the pipeline stage available to the next stage in the FIFO before the pipeline stage has latched the data element.

2. Description of the Related Art

FIFO pipelines are widely used in the computer, telecommunication, and related fields for the handling of data elements. A FIFO pipeline includes a plurality of N stages. Data elements enter at one end of the pipeline, and in a succession of steps, progress from one stage to the next. Eventually, the data elements exit the pipeline at the last or Nth stage, in the same order in which the data elements entered the FIFO (i.e., first-in first-out). FIFOs may be either synchronous or asynchronous. In a synchronous FIFO, the stages operate within the rhythm imposed from an outside source, such as a clock. Each task that is performed at a particular stage must be completed within the clock period. With asynchronous FIFOs, each stage operates at its own pace.

Figure 1:
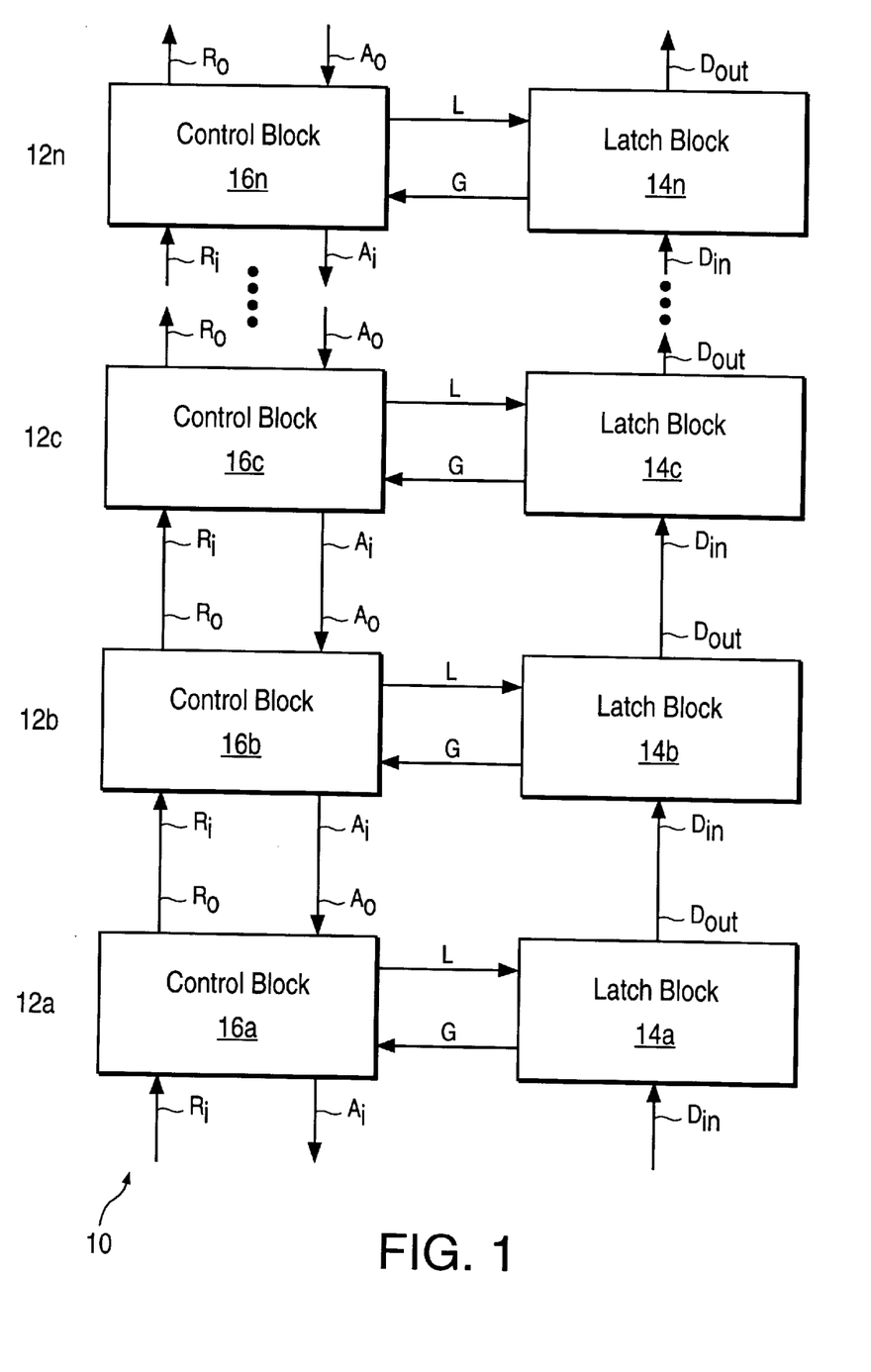
FIG. 1 is a block diagram of a FIFO.

Referring to FIG. 1, a block diagram of a FIFO is shown. The FIFO 10 includes a plurality of stages 12a through 12n. Each stage 12 includes a data latch block 14 and a corresponding control block 16. It is useful to note that throughout the following discussion, the term "current" stage is defined as a particular stage 12, the term "previous" stage is defined as the stage just prior to the current stage, and the "next" stage is defined as the stage immediately after the current stage. For example, if stage 12b is the current stage, then stage 12c is the next stage and stage 12a is the previous stage.

Each data latch block 14 is designed to operate in two states, either transparent or opaque. In the transparent state, the data element appearing at the output Dout of the latch block 14 is identical to the data element appearing at the input Din of latch block 14. If the data element at Din changes during the transparent state, the data element at Dout changes accordingly after a relatively minor propagation delay through the latch block 14. On the other hand, in the opaque state, the data element at output Dout of the latch block 14 remains static, regardless of whether the data element at the input Din of the latch block 14 changes. Accordingly, the data element in the latch block 14 is said to be held or latched in the opaque state.

The control block 16 of each stage 12 is responsible for managing data transfer in the FIFO 10. This management responsibility can be viewed as two interrelated tasks: control between neighboring control circuits 16 of adjacent stages 12; and control between the control block 16 and the corresponding data latch block 14 of each stage 12.

The control between the neighboring control circuits 16 of adjacent stages 12 is implemented using signals Request input (Ri), Request output (Ro), Acknowledge input (Ai), and Acknowledge output (Ao). The relationship between signals Ri, Ro, Ai, and Ao is best described using an example. Consider stage 12b as the current stage. On the input side of the current stage 12b, control block 16b receives signal Ri from control block 16a of the previous stage 12a, and signal Ai is generated by the control block 16b of the current stage 12b and provided to the control block 16a of the previous stage 12a. On the output side of the current stage 12b, the control block 16b generates signal Ro and provides it to the control block 16c of the next stage 12c, and signal Ao is received at the control block 16b from control block 16c of the next stage 12c. Signal Ro generated by the control block 16b of the current stage 12b is signal Ri received by the control block 16c of the next stage 12c, and signal Ai generated by the control block 16b of the current stage 12b is signal Ao received by the control block 16a of the previous stage 12a. The above defined relationship is similar for each stage 12 in the FIFO 10.

The significance of signals Ri, Ro, Ai and Ao is described below.

Ri—Indicates to the current stage that the data element appearing at input Din of the corresponding latch is valid and is available for latching;

Ro—Informs the next stage that the data element appearing on the output Dout of the current stage is valid and is available to the next stage for latching;

Ai—Indicates that the current stage has latched the data element appearing on its input Din; and Ao—Informs the current stage that the next stage has latched the data element appearing on output Dout of the current stage and allows the current stage to announce new valid data Dout when it becomes available.

The control between the control block 16 and its corresponding latch block 14 of each stage 12 is implemented using two signals, L and G. When the control block 16 sets signal L, it directs the latch block 14 to become opaque. In time, the latch block 14 sets signal G to inform the control block 16 that the latch block 14 has in fact become opaque. With two signals (L and G), the latch block 14 can be in one of four possible states at any given point in time. The four states are described in TABLE I below:

TABLE I

| L | G | State |
|---|---|-------|
| 0 | 0 | Transparent state |
| 1 | 0 | Latching state |
| 1 | 1 | Opaque state |
| 0 | 1 | Unlatching state |

In the Transparent state, the control block 16 is directing the latch block 14 to be transparent (L=0) and the actual state of the latch is transparent. In the Latching state, the control block 16 instructs the latch block 14 to become opaque, but the latch block 14 has not yet become opaque. In the Opaque state, the data element at Din at the input of the latch block 14 is safely latched. In the Unlatching state, the latch block 14 is unlatching and the data element at its output Dout is unreliable.

In the paper entitled "FIFO Controls for Four Stage Storage Elements" Sutherland, Sproull and Associates, publication number 4179, by Robert F. Sproull, Sep. 22, 1985, several control circuits for a FIFO are disclosed. In particular, FIGS. 5A–5C in the paper illustrate recommended control circuits for a transition signaling FIFO having latches that are normally transparent. With these circuits, signal "R" (analogous to signal Ro) and the signal "a" (analogous to signal Ai) are in fact the same signal and they are not generated until the latch is opaque. FIGS. 4A–4C in the paper illustrate recommended control circuits for a transition signaling FIFO having latches that are normally opaque. The signal "R" is generated only after (1) the signal "r" (analogous to signal Ri) is received from the previous stage, (2) the signal "A" (analogous to signal Ao) is received from the next stage, and (3) after the unlatching of the latch and data propagation time ($t_1$) through the latch. In other words, signal "R" is not asserted until the normally opaque latch first transitions to the transparent state and propagates the data through the latch.

A problem with the control circuits of the prior art is that they significantly impede the rate at which data elements can progress from a current stage to the next stage. In the two prior art circuits mentioned above, either a latching or an unlatching action of the latch must take place before the current stage can forward propagate the data element to the next stage. This problem adversely affects the performance of a FIFO in two critical performance measures. The latency period, which is defined as the period of time it takes for a data element to enter and then exit the FIFO, is significantly increased. The data throughput rate is also considerably slowed at each stage 12.

SUMMARY OF THE INVENTION

The present invention relates to several designs for a stage for use in a FIFO pipeline. The stage designs each include a latch that is capable of latching a data element and capable of transitioning between a transparent state and an opaque state. Each stage also includes a control circuit capable of announcing the availability of the data element to the next stage as soon as the data element has propagated through the latch and without any latching or unlatching action of the latch prior to the announcement of the availability of the data element. In other words, if the latch of a stage is transparent and receives a signal Ri from the previous stage, the control circuit of the stage generates signal Ro after receiving signal Ri, thus enabling the next stage to latch the data element before the current stage has itself latched that data element. This feature is possible because the next stage receives at the input Din of latch block the same data element that appears at the input Din of the current latch block when the current latch block is transparent. Accordingly, under these conditions, the prior art problem of first waiting for the latch to either latch or unlatch before forward propagation of the data element to the next stage is eliminated. The latency period of the pipeline and the average throughput rate of the stage are therefore improved.

DESCRIPTION OF THE DRAWINGS

The objects, features and advantages of the system of the present invention will be apparent from the following description in which.

DESCRIPTION OF THE PREFERRED EMBODIMENT

The present invention relates to several designs for a stage for use in a FIFO pipeline stage. Referring to FIG. 1, each stage 12 includes a latch block 14 that is capable of latching a data element and capable of transitioning between a transparent state and an opaque state. The stages also include a control block 16 capable of announcing the availability of a data element to the next stage as soon as the data element has propagated through the latch block 14 and without any latching or unlatching action of the latch prior to the announcement of the availability of the data element. For example, if the latch block 14b of a stage 12b is transparent and the control block 16b receives a signal Ri from the previous stage 12a, the control block 16b of the stage 12b generates signal Ro after receiving the signal Ri, thus enabling the next stage 12c to latch the data element before the stage 12b has itself latched that data element. This feature is possible because the next stage 12c receives at the input Din of latch block 14c the same data element that appears at the input Din of the current latch block 14b when the current latch block 14b is transparent. Accordingly, under these conditions, the prior art problem of first waiting for the latch to either latch or unlatch before forward propagation of the data element to the next stage 12c is eliminated. The latency period of the pipeline 10 and the average throughput rate of the stages 12 are therefore improved.

In the following, discussion the term "asserted", when used in the context of signals Ri, Ai, Ro, Ao, implies a transition of the signal in either direction. Further, the term "set" indicates a positive transition from a low to a high level and the term "clear" indicates a negative transition from a high to a low level for signals Ri, Ro, Ai, Ao, signal L and signal G.

The Applicants have found that signals Ro, Ai must be asserted, and L must be set under certain conditions to assure the operation of the FIFO 10 as described above. These conditions are defined by the functions specified in TABLE II below:

TABLE II

| Condition | Function |
| --- | --- |
| Set Ro | $\bar{G} \cdot Ri$ |
| Clear Ro | $\bar{G} \cdot \bar{Ri}$ |
| Set Ai | $G \cdot Ro$ |
| Clear Ai | $G \cdot \bar{Ro}$ |
| L | $(Ao \cdot \bar{Ro} + \bar{Ao} \cdot Ro) + G \, (\bar{Ai} \cdot Ri + Ai \cdot \bar{Ri})$ |

Figure 2:
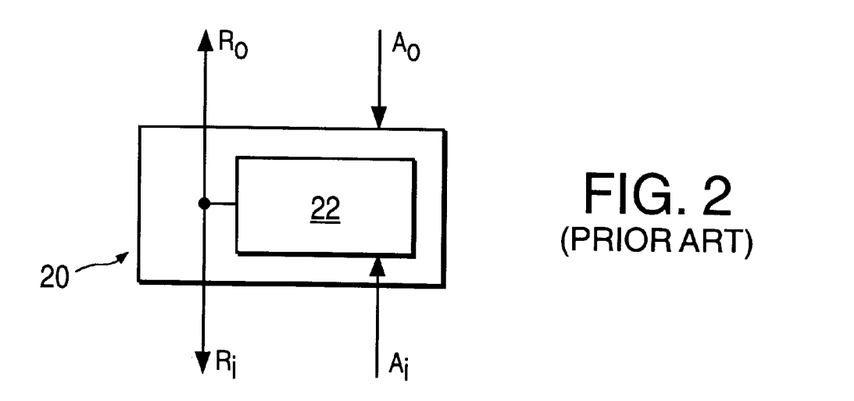
FIG. 2 is a control circuit for the FIFO according to a first embodiment of the present invention.

Referring to FIG. 2, a control circuit for the control block 16 of the FIFO 10 according to the present invention is shown. The circuit 30 includes a first XOR gate 32, AND gate 34, inverter 36, OR gate 38, second XOR gate 40, negative wait on gate 42, and positive wait on gate 44. With negative wait on gate 42, the output (Ro) equals the input (Ri) when its control input signal G is low. When G is high, the output (Ro) of negative wait on gate 42 maintains its current state and remains static, regardless of the changes that may occur on the input (Ri). With the positive wait on gate 44, the output Ao equals the input (Ai) when G is high. When the control input G is low, the output Ao remains static, regardless of the changes that may occur on the input Ai.

OPERATION

Initial State

In the initial state, signals Ri, Ro, Ai, Ao, L and G are all initially low (Ri=0, Ro=0, Ai=0, Ao=0, L=0, and G=0). Accordingly, the output 52 of XOR gate 32, the output 54 of AND gate 34, the output L of OR gate 38, the output 60 of XOR gate 40, the output Ro of negative wait on gate 42 and the output Ai of wait on gate 44 are all low. The output of inverter 36 is high because its input signal G is low in the initial state.

Latching Sequence

The circuit 30 implements the present invention by (1) asserting Ro after Ri is asserted; (2) setting signal L after Ri is asserted; and (3) clearing signal L only after both the signal G is set and the signal Ao from the next stage is asserted. The actual latching sequence of the circuit 30 is now described.

Step 1: When Ri transitions high, the output Ro of the negative wait gate 42 transitions and is asserted because G at the control input of the gate is low.

Step 2: When Ro transitions high, it causes the output 60 of XOR gate 40 to transition high. Similarly, the output 52 of XOR gate 32 transitions high because its Ri input is high and the signal Ai input is low. The output 56 of inverter 36 is high because G is low. The output 54 of AND gate 34 transitions high since both of its inputs are high. Consequently, both inputs into OR gate 38 are high and the signal L is set. The latch block 14 thus enters the "latching" state.

Step 3: When the latch becomes "opaque", the signal G transitions high and is set. When G is set, the output Ai of the positive wait on gate 44 is asserted because its input Ro is high and its control input G is high. Accordingly, the previous stage (e.g., 12a) is informed that the data is safely latched in the current stage (e.g., 12b). It should be noted that when Ai transitions high, the output 52 of XOR and the output 54 of AND gate 34 both transition low.

Step 4: When the signal Ao is asserted from the next stage, it causes the output 60 of XOR gate 40 to transition low since both inputs to the gate are high. As a consequence, the signal L transitions low and is cleared since both inputs to OR gate 38 are low and the latch block 14 enters the "unlatching" state.

During operation, Ao may be asserted before G is set or vice versa. With control circuit 30, the signal L is cleared only after both Ao is asserted and G is set, and therefore the order in which Ao and G are asserted and set is irrelevant. The current latch (e.g., 14b) enters the transparent state only after the signal Ao from the next stage 12c is asserted, indicating that the next stage 12c has successfully latched the data element.

For the next data element, the signals Ri, Ro, Ai and Ao each transition from high to low during the passage of the next data element through the data latch block 14. It should be noted, however, that the signals L and G transition from low to high (set) and then back to low (clear) with the passage of each data element through the data latch block 14.

With the control circuit 30, the signal Ao may be asserted before signal G is set, indicating that the next stage (e.g., 12c) has successfully latched the data before the current stage 12b. Under these circumstances, it makes little sense for the current stage to complete the latching process. It would therefore be advantageous to either (1) assure that Ao is asserted after the data latch block 14b has latched the data element and the signal G is set, or (2) abort the latching process if a current stage receives asserted Ao either prior to or during the period when signal G is set.

Figure 3:
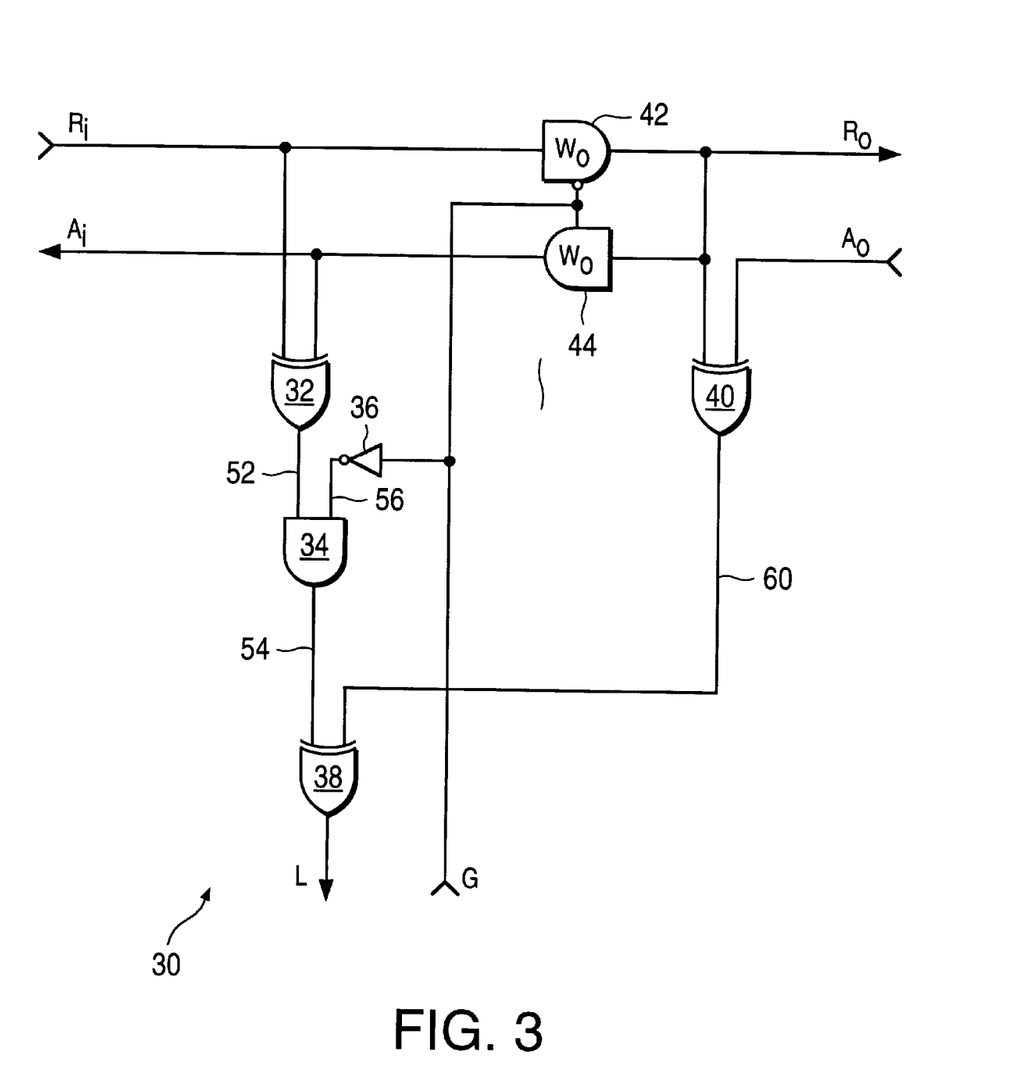
FIG. 3 is a control circuit for the FIFO according to a second embodiment of the present invention.

Referring to FIG. 3, a control circuit 50 for the control block 16 in the FIFO 10 according to a second embodiment of the invention is shown. The control circuit 50 is useful in a FIFO 10 where the signal Ao becomes asserted only after the data latch block 14 latches the data element and signal G is set. The circuit 50 includes XOR gate 40, negative wait on gate 42, and positive wait on gate 44. The control circuit 50 is a simplified version of the control circuit 30. The difference between the two circuits being XOR gate 32, AND gate 34, OR gate 38 and inverter 36 have all been removed from control circuit 50. During operation, signal Ro is asserted, signal G is set, and signal Ai is asserted in the same manner as describe above with respect to control circuit 30. Signal L, however, is set when Ro is asserted and is cleared only when signal Ao is asserted.

Figure 4:
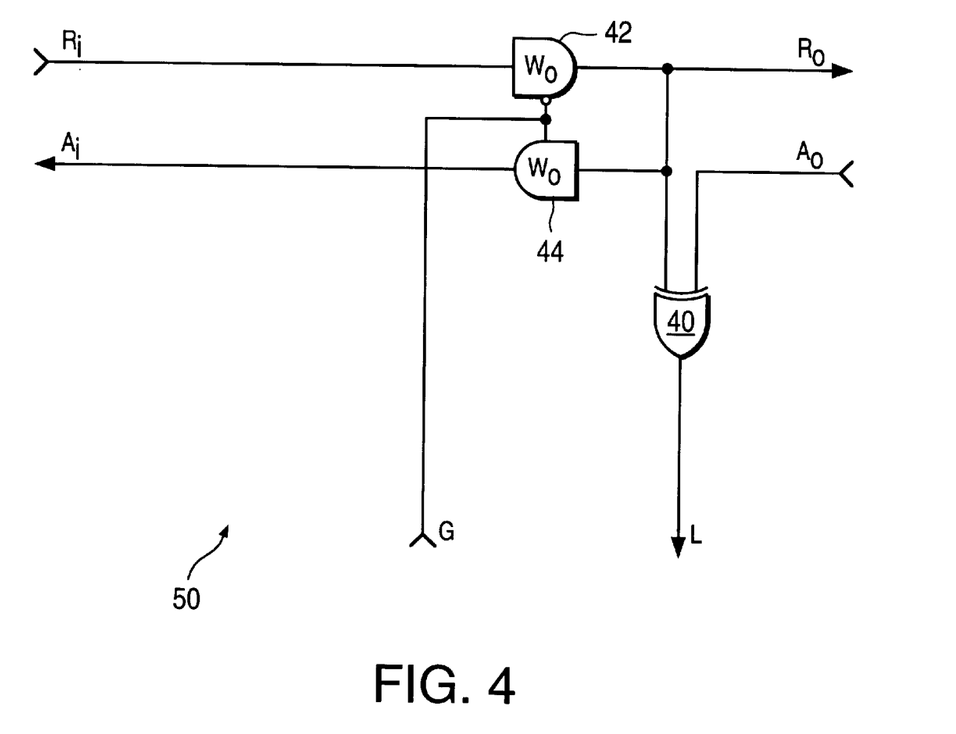
FIG. 4 is a block diagram of a FIFO stage according to another embodiment of the present invention.

Referring to FIG. 4, a block diagram of a FIFO stage capable of aborting a latching operation according to another embodiment of the present invention is shown. The stage 80 is similar to those illustrated in FIG. 1, and includes a latch block 14, and a corresponding control block 16. The latch block 14 receives a data element at input Din and provides the data element at output Dout. The control block 16 receives signals Ri and Ao from neighboring stages (not shown) and generates signals Ro and Ai in the same manner as described above. The essential difference between the stage 80 and the stage 12 is that signal G has been removed and replaced by two signals, W and S.

The three signals L, W and S are used to govern the latching, unlatching and abort procedures between the control block 16 and the latch block 14. When the control block 16 sets signal L, it directs the latch block 14 to become opaque. In response, the latch successively sets signal W followed by signal S. The two signal W and S permit a higher degree of resolution as to the state of the stage 80. The TABLE III below provides the various relevant states based on the value of signals L, W and S. Further, the term "set" indicates a positive transition from a low to a high level and the term "clear" indicates a negative transition from a high to a low level for signals Ri, Ro, Ai, Ao, signal L, signal W, and signal S.

TABLE III

| L | W | S | State |
| --- | --- | --- | --- |
| 0 | 0 | 0 | Transparent |
| 1 | 0 | 0 | Latching Requested |
| 1 | 1 | 0 | Latching Initiated |
| 1 | 1 | 1 | Latched |
| 0 | 1 | 1 | Unlatching Requested |
| 0 | 1 | 0 | Unlatching Initiated |
| 0 | 0 | 0 | Transparent |

During operation, the stage 80 is initially in the transparent state (L=0, W=0, S=0). After signal Ri is asserted, the control block 16 sets the signal L, and the stage 12 enters the Latching Requested state. The latch block 14 then sets the W signal, indicating that it is in the Latching Initialized state. Eventually, when the latch block 14 becomes opaque, it enters the Latched State by setting signal S. When signal Ao is asserted after the Latched state is reached, the stage 80 successively transitions from the Latched state to the Unlatching Requested state, Unlatching Initiated state and finally the Transparent state as signals L, S, and W respectively are successively cleared. Thereafter, the stage 80 is ready to propagate the next data element forward.

The abort feature is invoked if signal Ao is asserted before the Latched state is reached. If the signal Ao is asserted during the Transparent state or during the Latching Requested state, the state of stage 80 remains unchanged and the signal L remains set. However, when the signal W becomes set, then the stage 80 enters the Latching Initiated state, and but before the Latched state is reached, the stage 80 transitions to the Unlatching Initiated state by clearing signal L. If the signal Ao is asserted during the Latched state, the stage 80 transitions to the Unlatching Requested state by clearing signal L just as described above. Hence, the latching operation is aborted before the stage 80 has reached the latched state. The TABLE IV below summarizes the state transitions that result when signal Ao is asserted in the Transparent state, Latching Requested State, Latching Initiated state and the Latched state.

TABLE IV

| Present State | | | | New State | | | |
|---|---|---|---|---|---|---|---|
| L | W | S | Name | L | W | S | Name |
| 0 | 0 | 0 | Transparent | 0 | 0 | 0 | Transparent (no change) |
| 1 | 0 | 0 | Latching Requested | 1 | 0 | 0 | Latching Requested (no change) |
| 1 | 1 | 0 | Latching Initiated | 0 | 1 | 0 | Unlatching Initiated |
| 1 | 1 | 1 | Latched | 0 | 1 | 1 | Unlatching Requested |

The use of three signals, L, W and S, in the stage 80 allows the implementation of the abort feature in the stage 80. The three signals L, W, and S, as opposed to the two signals L and G as used in the stage 12, makes it possible for control block 16 to distinguish between the Latching Requested state (L=1, W=0, S=0) and the Latching Initiated state (L=1, W=1, S=0). When signal Ao is asserted before the stage reaches the Latched state, a significant amount of time is saved because the stage 80 does not cycle through all of the above defined states.

It is useful to note that if signal Ao is asserted while the stage 80 is in the Latching Requested state, the clearing of signal L is not permitted because the latching process might already be in progress and the latch block 14 may not be transparent. Allowing L to be cleared in this case may lead to unreliable operation of the latch block 14 if the next data element fails to propagate from the input Din to the output Dout of the latch block 14. However, once W has been received back and the stage 80 enters the Latching Initiated state, L may be deasserted, and the latching process can safely be aborted. It is also useful to note that a delay in the response to the clearing of L in the Latching Initiated state (L=1, W=1, S=0) might lead to the setting of the signal S even following the clearing of L, so that the Unlatching Requested state (L=0, W=1, S=1) is reached, rather than the Unlatching Initiated state (L=0, W=1, S=0).

The Applicants have found that signals Ro and Ai must be asserted, and signal L must be set under certain conditions to assure proper operation of the stage 80. These conditions are defined by the functions specified in TABLE V below:

TABLE V

| Condition | Function |
|---|---|
| Set Ro | $\bar{W} \cdot Ri$ |
| Clear Ro | $\bar{W} \cdot Ri$ |
| Set Ai | $(\bar{S} \cdot W \cdot \overline{Ao}) + (S \cdot Ro) + (W \cdot Ao \cdot Ro)$ |
| Clear Ai | $(\bar{S} \cdot W \cdot \overline{Ao}) + (S \cdot \bar{Ro}) + (W \cdot \bar{Ao} \cdot \bar{Ro})$ |
| Set L | $\bar{W} \cdot ((Ao \cdot \bar{Ri}) + (\bar{Ao} \cdot Ri))$ |
| Clear L | $W \cdot ((\bar{Ao} \cdot \bar{Ro}) + (Ao \cdot Ro))$ |

Figure 5:
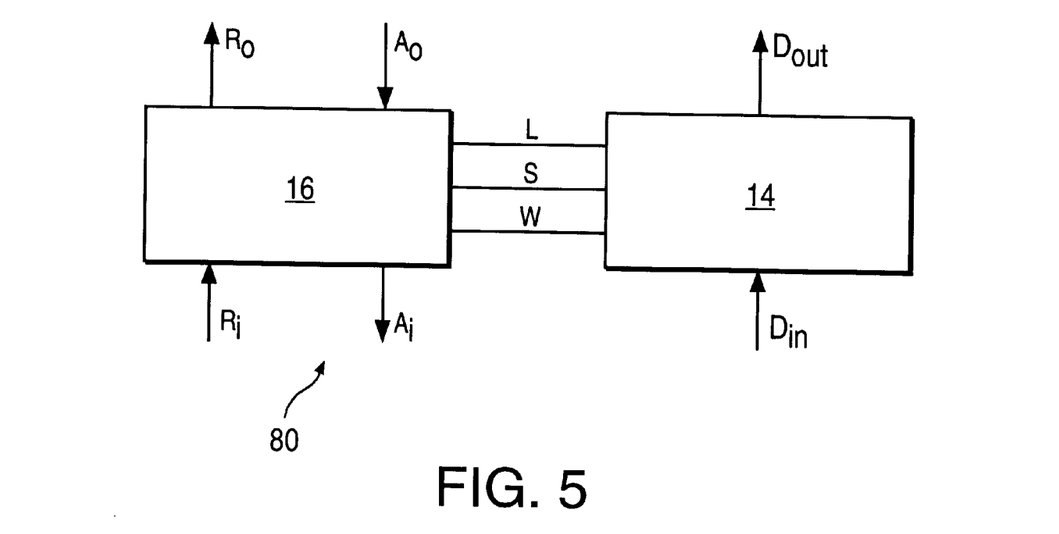
FIG. 5A–5C are a control circuits for the FIFO stage according to a third embodiment of the present invention.

Referring to FIG. 5A, a circuit 100 for implementing the above-defined functions for signal Ro is shown. The circuit 100 includes a negative wait on gate 102. The output Ro transitions high when the input Ri is high, and the control input W is low (W=0). The output Ro retains its previous state and remains static regardless of the changes that may occur with input signal Ri when the control input W is high (W=1).

Referring to FIG. 5B, a circuit 110 for implementing the above-defined functions for signal Ai is shown. The circuit 110 includes SR flip flop 112, OR gate 114, AND gate 116, OR gate 118, AND gate 120, OR gate 122, AND gate 124, AND gate 126, and OR gate 128.

Signal Ai is coupled to the Q output of flip flop 112. The S input of flip flop 112 is coupled to receive the output 134 of OR gate 114. OR gate 114 is coupled to receive the output 136 of AND gate 116 and the output 140 of AND gate 120. AND gate 116 is coupled to receive signal S and signal Ro as inputs to the gate. AND gate 120 is coupled to receive signal W, Ao and the output 138 from OR gate 118 as inputs to the gate. OR gate 118 is coupled to receive signal Ro and signal $\bar{S}$ as inputs to the gate. When any of the above-defined conditions for setting Ai are present, the above logic causes the flip flop 112 to set signal Ai.

Signal $\overline{Ai}$ is coupled to the $\bar{Q}$ output of flip flop 112. The R input of flip flop 112 is coupled to receive the output signal 142 from OR gate 122. OR gate 122 is coupled to receive the output signal 144 from AND gate 124 and the output signal 146 from AND gate 126 respectively. AND gate 124 is coupled to receive signal S and signal $\overline{Ro}$ at its inputs respectively. AND gate 126 is coupled to receive signal W, signal $\overline{Ao}$, and the output signal 148 from OR gate 128 respectively. The OR gate 128 is coupled to receive signal $\bar{S}$ and $\overline{Ro}$ at its inputs respectively. When any of the above defined conditions for clearing Ai are present, the above logic causes the flip flop 112 to clear signal Ai.

Referring to FIG. 5C, a circuit 150 for implementing the above-defined functions for signal L is shown. The circuit 150 includes an XOR 152, AND gate 154, AND gate 156, and XNOR gate 158 and flip flop 160. The (S) input of flip flop 160 is coupled to the output 164 of AND gate 154. The AND gate 154 is coupled to receive signal $\bar{W}$ and the output 162 from XOR gate 152. XOR gate 152 is coupled to receive input signals Ao and Ri. The (R) input of flip flop 160 is coupled to the output 166 of AND gate 156. The input of AND gate 156 is coupled to receive signal W and the output 168 from XNOR gate 158. The XNOR gate is coupled to receive signal Ao and signal Ro. When either of the above defined conditions are present for setting and clearing signal L are present, the above described logic causes the flip flop 160 to either set or clear signal L respectively.

Figure 6A:
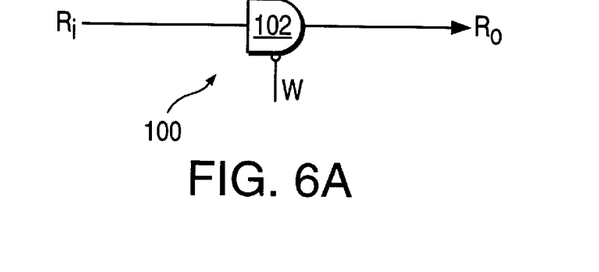
FIG. 6 is a block diagram of a latch according to one embodiment of the present invention.
Figure 6B:
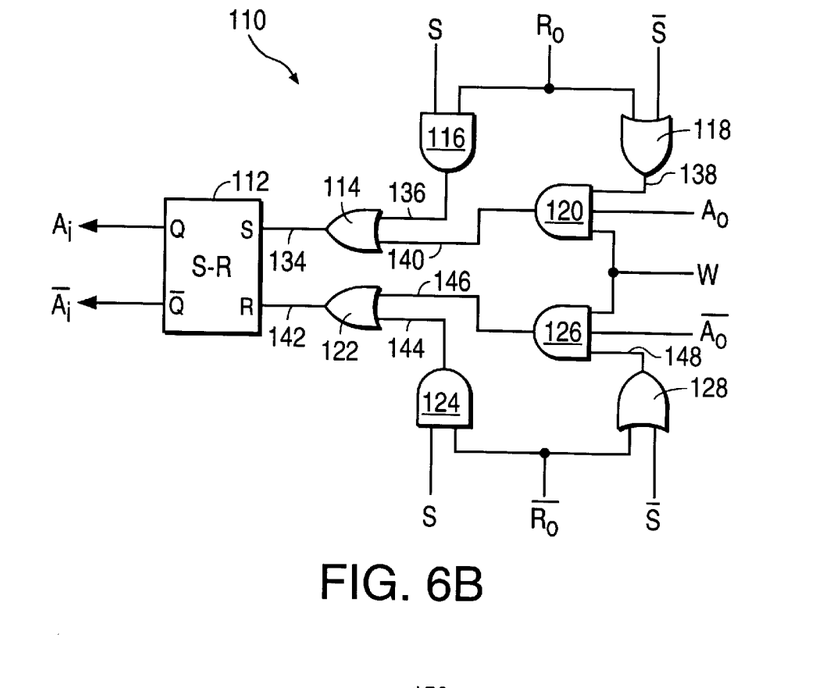
Figure 6C:
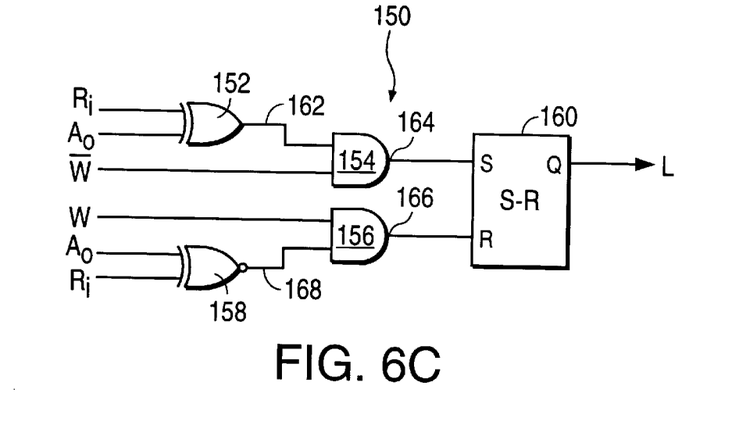

Referring to FIG. 6, a block diagram of a latch for use in the latch block 14 of the present invention is shown. The latch 200 includes an input node Din coupled to receive an incoming data element, an output node Dout coupled to provide an outgoing data element, and a control input node C coupled to receive a control signal H. When the control signal H changes from cleared to set, the internal gating circuitry (not shown) of the latch 200 latches the incoming data element then present at node Din and maintains the data element at node Dout. In the opaque state, the data element at output node Dout is maintained constant, regardless of any changes that may occur at the input node Din. When the control signal H is cleared, the latch 200 is in the transparent state. In the transparent state, a new data element appearing at input node Din is rapidly passed to the output node Dout. When the data latch 200 is neither transparent or opaque (i.e., in transition between the two states), it is uncertain whether a new data element at the input node Din will cause a change at the output node Dout of the latch 200. Therefore, after the latch transitions from opaque to transparent in response to clearing of the control signal H, signal H has to be set again before the data element appearing at the output node Dout is again maintained constant even if the input data element at node Din changes. According to different embodiments of the present invention, one or more of the latches 200 may be used in a latch block 14 and a variety of well known latch circuits may be used for the latch 200.

Figure 7:
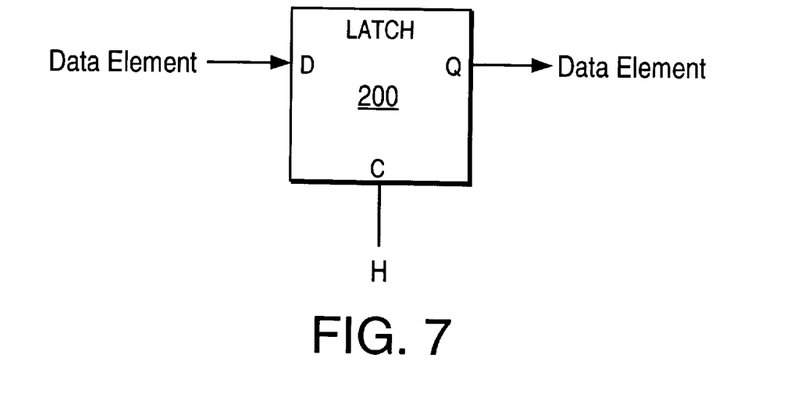
FIG. 7 is a latch circuit according to one embodiment of the present invention.

Referring to FIG. 7, a circuit suitable for generating the control signal H and the signal G within the latch block 14 of the two signal (L and G) version of the pipeline stage 12 is shown. The control circuit 300 includes a buffer 302 and a Schmitt trigger circuit 304. The input of the buffer 302 is coupled to receive signal L from the control block 16. The output of the buffer 302 generates the control signal H in response to the latch signal L. When signal L is set, the control signal H is set and when signal L is cleared, the control signal H is cleared. The buffer 302 amplifies the signal L so that when set, the control signal H is capable of driving one or more of the latches 200. The Schmitt trigger 304 is coupled to receive the control signal H from the buffer 302 and to generate signal G in response thereto.

The hysteresis property of the Schmitt trigger 304 is used to apply its two different threshold voltages, Vt-high and Vt-low, to the latch control signal H. If signal L and the control signal H are low, indicating that the latch 200 is transparent, the output G of the Schmitt trigger 304 is low. When signal L is set (high), the control signal H transitions from low to high. When control signal H reaches Vt-high, the Schmitt trigger 304 fires and sets signal G (high). The setting of signal G indicates that the latch block 14 has reached the opaque state. When signal L, in due course, is cleared (low), the control signal H transitions from high to low. When the control signal H reaches Vt-low, the Schmitt trigger 304 fires, driving signal G low, indicating that the latch block 14 has reached the transparent state.

According to various embodiments of the present invention, any Schmitt trigger circuit that can provide suitable values of Vt-low and Vt-high may be used. Millman, in the textbook entitled "Microelectronics, Digital and Analog Circuits and Systems", McGraw-Hill Book Company, 1979, pages 622–625, provides several examples of Schmitt trigger circuits and describes their theory of operation. In another non-Schmitt trigger embodiment, a circuit such as that illustrated in FIG. 1b of the above-mentioned Sproull publication may be used to generate signal G.

Figure 8:
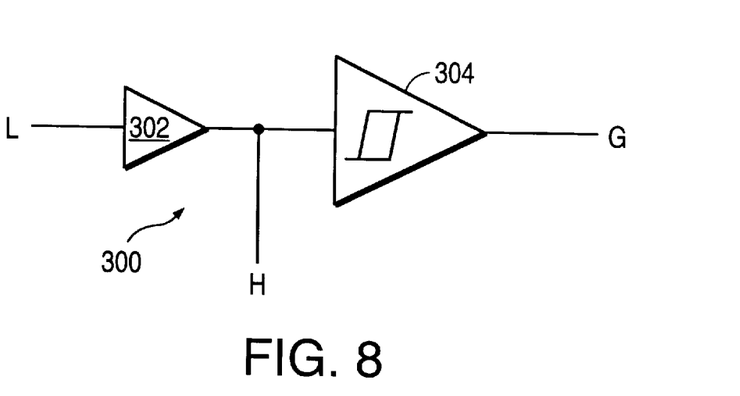
FIG. 8 is another latch circuit according to another embodiment of the present invention.
Figure 9:
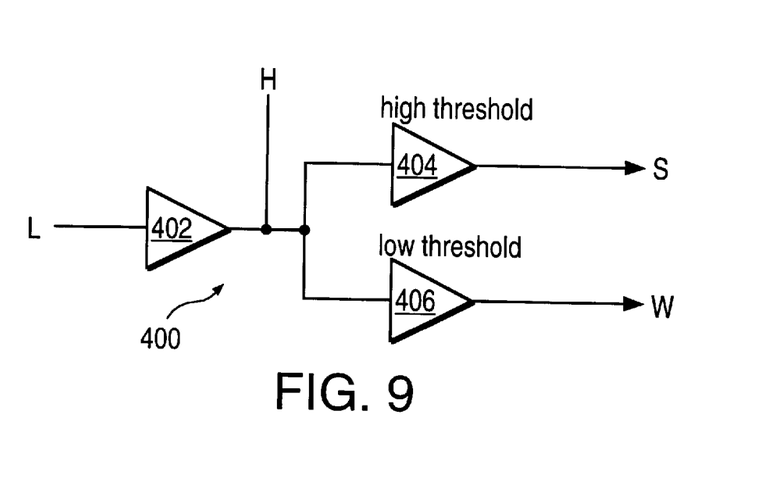

Referring to FIG. 8, a circuit suitable for generating the control signal H and the signals W and S within the latch block 14 in the three signal (L, W and S) version of the pipeline stage 80 is shown. The circuit 400 includes a buffer 402, a high threshold device 404 and a low threshold device 406. The input of the buffer 402 is coupled to receive signal L from the control block 16. The output of the buffer 402 generates the control signal H in response to the latch signal L. When the signal L is set, the control signal H is set and when the signal L is cleared, the control signal H is cleared. The buffer 402 amplifies the signal L so that when set, the control signal H is capable of driving one or more of the latches 200 in the latch block 14. The high threshold device 404 is coupled to receive the control signal H from the buffer 402 and to generate signal S in response thereto. The low threshold device 406 is coupled to receive the control signal H from the buffer 402 and to generate signal W in response thereto.

The high threshold voltage (Vt-high) of device 404 and the low threshold (Vt-low) of the device 406 are applied to the latch control signal H received from the output of buffer 402. If the signal L is cleared, the control signal H is low. Since signal H is less than Vt-low of the low threshold device 406, the signal W is low, indicating that the latches 200 in the latch block 14 are transparent. When signal L is set (high), indicating the Latching Requested state, the control signal H transitions from low to high. When control signal H reaches Vt-low, the low threshold device 406 drives the signal W high, indicating that the stage 80 is in the Latching Initiated state. Eventually, as control signal H completes its transition from low to high, the signal H reaches Vt-high, and the high threshold device 404 drives the signal S high, indicating that the stage 80 is in the Latched state. When signal L, in due course, is cleared (low), the control signal H transitions from high to low. The high threshold device 404 and the low threshold device 406 successively turn off in response, clearing signal S and W respectively. Accordingly, the stage 80 changes from the Latched state to the Unlatching Requested and Unlatching Initiated states, and back to the Transparent state. It is useful to note that because Vt-high is greater then Vt-low, the case (S=1, W=0) cannot occur.

The various control circuits of the present invention may be used in a wide variety of applications. For example, the control circuits may be used in a simple FIFO in which the data elements pass through each stage unmodified. In another example, the control circuits of the present invention may be used in an instruction execution pipeline in a processor wherein the data elements are modified at one or more of the stages in the pipeline. In yet another example, the control circuits of the present invention may be used in the counterflow pipeline and the counterflow pipeline processor, as described in the above mentioned pending U.S. patent applications respectively.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. Hence, the description is thus to be regarded as illustrative instead of limiting on the present invention.

What is claimed is:

1. An apparatus, comprising;
    a latch capable of latching a data element and capable of transitioning between a transparent state and an opaque state;
    a control circuit capable of announcing the availability of the data element to a data destination as soon as the data element has propagated through the latch and without any latching or unlatching action of the latch prior to the announcement of the availability of the data element.

2. The apparatus of claim 1, wherein the control circuit is further for directing the latch to latch the data element.

3. The apparatus of claim 2, wherein the control circuit is further for directing the latch to abort the latching of the data element in the event the data destination provides permission to send another data element.

4. The apparatus of claim 3, wherein the control circuit is further for directing the latch and the control circuit to transition from a Latching Requested state to an Unlatching Initiated state when the control circuit is directing the latch to abort the latching of the data element.

5. The apparatus of claim 1, wherein the control circuit is further for asserting a latch signal directing the latch to latch the data element.

6. The apparatus of claim 1, wherein the latch is further for asserting a latching initiated signal informing the control circuit that the latch has initiated latching of the data element.

7. The apparatus of claim 1, wherein the latch is further for asserting a latched signal informing the control circuit that the latch has latched the data element.

8. The apparatus of claim 1, wherein the latch and the control circuit are further for sequencing through a Transparent state; a Latching Requested state; a Latching Initiated state; a Latched state; an Unlatching Requested state; an Unlatching Initiated state and back to the Transparent state.

9. The apparatus of claim 3, wherein the latch and the control circuit are further for sequencing through a Transparent state; a Latching Requested state; an Unlatching Initiated state and for returning to the Transparent state when the latching of the data element is aborted.

10. The apparatus of claim 1, wherein the control circuit is further for generating a signal for announcing to the data destination that the data element appearing at an output node of the latch is valid and available.

11. The apparatus of claim 1, wherein the control circuit is further for generating a signal which informs the data source it may send another data element to the latch.

12. The apparatus of claim 11, wherein the signal is generated when the latching of the data element is aborted.

13. The apparatus of claim 11, wherein the signal is generated when the data element is latched.

14. The apparatus of claim 11, further comprising an N stage FIFO including one stage comprising the latch and the control circuit.

15. The apparatus of claim 11, further including an N stage pipeline including one stage comprising the latch and the control circuit.

16. The apparatus of claim 1, wherein the latch comprises one or more latch circuits.

17. The apparatus of claim 1, wherein the latch includes a Schmitt trigger.

18. The apparatus of claim 1, wherein the control circuit comprises logic circuitry for generating a control signal for controlling the latch.

19. The apparatus of claim 1, wherein the control circuit comprises logic circuitry for asserting a communication signal to communicate with the data source.

20. The apparatus of claim 1, wherein the control circuit comprises logic circuitry for asserting a communication signal to communicate with the data destination.

21. The apparatus of claim 1, wherein the control circuit further comprises logic circuitry for receiving a signal from the data source.

22. The apparatus of claim 1, wherein the control circuit further comprises logic circuitry for receiving a signal from the data destination.

23. An apparatus, comprising:
a latch capable of latching a data element and capable of transitioning between a transparent state and an opaque state; and
a control circuit capable of announcing the availability of the data element to a data destination after the data element has propagated through the latch and without any latching or unlatching action of the latch prior to the announcement of the availability of the data element, the control circuit being responsive to control signals operating within a two phase transition signaling protocol.

24. The apparatus of claim 23, wherein the control circuit is further capable of directing the latch to latch the data element.

25. The apparatus of claim 24, wherein the control circuit is further capable of directing the latch to abort the latching of the data element in the event the data destination provides permission to send another data element.

26. The apparatus of claim 25, wherein the control circuit is further capable of directing the latch to transition from a Latching Requested state to an Unlatching Initiated state when the control circuit is directing the latch to abort the latching of the data element.

27. The apparatus of claim 23, wherein the control circuit is further capable of asserting a latch signal directing the latch to latch the data element.

28. The apparatus of claim 23, wherein the latch is capable of asserting a latching initiated signal which informs the control circuit that the latch has initiated latching of the data element.

29. The apparatus of claim 23, wherein the latch is capable of asserting a latched signal which informs the control circuit that the latch has latched the data element.

30. The apparatus of claim 23, wherein the latch and the control circuit are capable of sequencing through a Transparent state; a Latching Requested state; a Latching Initiated state; a Latched state; an Unlatching Requested state; an Unlatching Initiated state and back to the Transparent state.

31. The apparatus of claim 25, wherein the latch and the control circuit are further for sequencing through a Transparent state; a Latching Requested state; an Unlatching Initiated state and for returning to the Transparent state when the latching of the data element is aborted.

32. The apparatus of claim 23, wherein the control circuit is capable of generating a signal for announcing to the data destination that the data element appearing at an output node of the latch is valid and available.

33. The apparatus of claim 23, wherein the control circuit is capable of generating a signal which informs the data source it may send another data element to the latch.

34. The apparatus of claim 33, wherein the signal is generated when the latching of the data element is aborted.

35. The apparatus of claim 33, wherein the signal is generated when the data element is latched.

36. The apparatus of claim 33, further comprising an N stage FIFO including one stage comprising the latch and the control circuit.

37. The apparatus of claim 33, further including an N stage pipeline including one stage comprising the latch and control circuit.

38. The apparatus of claim 23, wherein the latch comprises one or more latch circuits.

39. The apparatus of claim 23, wherein the latch includes a Schmitt trigger.

40. The apparatus of claim 23, wherein the control circuit comprises logic circuit capable of generating a control signal for controlling the latch.

41. The apparatus of claim 23, wherein the control circuit comprises logic circuitry capable of asserting a communication signal to communicate with the data source.

42. The apparatus of claim 23, wherein the control circuit comprises logic circuitry capable of asserting a communication signal to communicate with the data destination.

43. The apparatus of claim 23, wherein the control circuit further comprises logic circuitry capable of receiving a signal from the data source.

44. The apparatus of claim 23, wherein the control circuit further comprises logic circuitry capable of receiving a signal from the data destination.

45. The apparatus of claim 23, wherein one of the control signals is a request input signal which signifies that the data element appearing at an input of the latch is valid and available for latching.

46. The apparatus of claim 23, wherein one of the control signals is an acknowledgment input signal that signifies to a source of the data element that the latch has latched the data element.

47. The apparatus of claim 23, wherein one of the control signals is request output signal which signifies to the data destination that the data element is valid.

48. The apparatus of claim 23, wherein one of the control signals is an acknowledgment output signal that informs the control circuit that the data destination has latched the data element.

49. The apparatus of claim 23, wherein a transition from a low logic level to a high logic level or vice versa of one of the control signals indicates the assertion of the one control signal.

50. A method comprising the steps of:

providing a latch capable of latching a data element and capable of transitioning between a transparent state and an opaque state; and providing a control circuit capable of announcing the availability of the data element to a data destination after the data element has propagated through the latch and without any latching or unlatching action of the latch prior to the announcement of the availability of the data element, the control circuit being responsive to control signals operating within a two phase transition signaling protocol.

51. The method of claim 50, wherein the step of providing a control circuit further includes transitioning one of the control signals from a low logic level to a high logic level or vice versa to assert the one control signal.

* * * * *